(12) United States Patent
Rowlands et al.

(10) Patent No.: US 12,547,400 B2
(45) Date of Patent: *Feb. 10, 2026

(54) CATALOG FOR MANAGING MODULAR CODE

(71) Applicant: Sophos Limited, Abington (GB)

(72) Inventors: Anthony Thomas Rowlands, Moore, OK (US); Michael Joseph Fraser, Incline Village, NV (US)

(73) Assignee: Sophos Limited, Abingdon (GB)

( * ) Notice: Subject to any disclaimer, the term of this patent is extended or adjusted under 35 U.S.C. 154(b) by 150 days.

This patent is subject to a terminal disclaimer.

(21) Appl. No.: 17/946,752

(22) Filed: Sep. 16, 2022

(65) Prior Publication Data
US 2024/0095029 A1    Mar. 21, 2024

(51) Int. Cl.
*G06F 9/06* (2006.01)
*G06F 8/30* (2018.01)

(52) U.S. Cl.
CPC . *G06F 9/06* (2013.01); *G06F 8/30* (2013.01)

(58) Field of Classification Search
CPC ..................................... G06F 9/06; G06F 8/30
USPC .......................................................... 707/798
See application file for complete search history.

(56) References Cited

U.S. PATENT DOCUMENTS

| | | | | |
|---|---|---|---|---|
| 8,141,162 B2 * | 3/2012 | Myles | ................... | G06F 21/606 712/226 |
| 8,151,282 B2 * | 4/2012 | Carnahan | .............. | G06F 9/4494 719/328 |
| 10,534,983 B1 * | 1/2020 | Tung | ...................... | G06N 5/022 |
| 10,902,046 B2 * | 1/2021 | Carrier | .................. | G06F 16/322 |
| 11,221,831 B1 * | 1/2022 | Al Khafaji | ................ | G06F 8/36 |
| 11,281,673 B2 * | 3/2022 | Nanda | ................ | G06F 16/24568 |
| 11,403,094 B2 * | 8/2022 | Mirantes | ............. | G06F 9/44505 |
| 11,431,785 B2 * | 8/2022 | Spaven | ................... | H04L 43/04 |
| 11,461,672 B2 * | 10/2022 | Filoti | ..................... | G06N 3/004 |
| 11,500,895 B2 * | 11/2022 | Fan | ......................... | G06F 16/27 |
| 11,775,898 B1 * | 10/2023 | Thompson | ....... | G06Q 10/06315 707/999.102 |
| 11,823,073 B2 * | 11/2023 | Doan Huu | ............. | G06N 20/00 |
| 11,983,189 B2 * | 5/2024 | Fan | ................... | G06F 16/24573 |
| 2004/0017395 A1 * | 1/2004 | Cook | ..................... | G06Q 30/02 715/745 |
| 2006/0229896 A1 * | 10/2006 | Rosen | ................ | G06Q 10/1053 705/321 |
| 2007/0011437 A1 * | 1/2007 | Carnahan | .............. | G06F 9/4494 712/200 |
| 2009/0113553 A1 * | 4/2009 | Myles | ..................... | G06F 21/85 713/150 |
| 2011/0029549 A1 * | 2/2011 | Pandya | .................. | G11C 15/00 707/E17.014 |

(Continued)

OTHER PUBLICATIONS

REFACTR, "Building Pipelines", Wiki materials published to refactr. it website on or about May 17, 2021 , 4 Pages.

(Continued)

*Primary Examiner* — Hanh B Thai
(74) *Attorney, Agent, or Firm* — Strategic Patents, P.C.

(57) ABSTRACT

A catalog of pipelines for modular coding integrates resources for consistent use and verification of individual pipeline components. The platform may incorporate tools and metadata for version control, verification, and licensing in order to support a user when creating and deploying applications using resources from the catalog.

20 Claims, 5 Drawing Sheets

(56) References Cited

U.S. PATENT DOCUMENTS

| | | | | |
|---|---|---|---|---|
| 2014/0108321 | A1* | 4/2014 | Buchanan | G06N 5/02 706/50 |
| 2014/0359119 | A1* | 12/2014 | Spaven | G06F 9/546 709/224 |
| 2014/0365575 | A1* | 12/2014 | Spaven | H04L 67/10 709/204 |
| 2016/0004973 | A1* | 1/2016 | Trenkov | G06Q 10/10 706/48 |
| 2018/0342324 | A1* | 11/2018 | Cha | C09K 11/70 |
| 2019/0243836 | A1* | 8/2019 | Nanda | G06F 16/24568 |
| 2019/0303579 | A1* | 10/2019 | Reddy | H04L 9/3239 |
| 2020/0021620 | A1* | 1/2020 | Puratheparambil | H04L 63/205 |
| 2020/0082223 | A1* | 3/2020 | Tung | G06N 5/04 |
| 2020/0151588 | A1* | 5/2020 | Doan Huu | G06N 20/00 |
| 2020/0175051 | A1* | 6/2020 | Carrier | G06Q 10/063 |
| 2020/0257990 | A1* | 8/2020 | Filoti | G06N 5/027 |
| 2020/0394305 | A1 | 12/2020 | Cosgrove et al. | |
| 2021/0232388 | A1* | 7/2021 | Mirantes | G06F 9/44505 |
| 2021/0292646 | A1* | 9/2021 | Cha | G16H 10/60 |
| 2021/0303584 | A1* | 9/2021 | Fan | G06F 16/2291 |
| 2021/0303585 | A1* | 9/2021 | Fan | G06F 16/27 |
| 2021/0334254 | A1* | 10/2021 | Thompson | G06Q 10/06315 |
| 2021/0377146 | A1* | 12/2021 | Sommers | H04L 43/14 |
| 2022/0121479 | A1* | 4/2022 | Chivukula | G06F 9/5038 |
| 2022/0121480 | A1* | 4/2022 | Chivukula | G06F 9/5072 |
| 2022/0374443 | A1* | 11/2022 | Fan | G06F 16/24564 |
| 2023/0045235 | A1* | 2/2023 | Pierscieniak | G06F 8/65 |
| 2023/0092030 | A1* | 3/2023 | Battaglia | G06F 8/10 717/104 |
| 2023/0101551 | A1* | 3/2023 | Jobanputra | G06F 16/27 707/822 |
| 2023/0128753 | A1* | 4/2023 | Bawa | G06F 8/20 717/176 |
| 2023/0161945 | A1* | 5/2023 | Vadapandeshwara | G06F 40/12 715/234 |
| 2023/0259650 | A1* | 8/2023 | Sepehri | G06F 16/906 726/1 |
| 2023/0267483 | A1* | 8/2023 | Joshi | G06Q 30/0202 705/7.31 |
| 2023/0315534 | A1* | 10/2023 | Asawa | H04W 48/18 718/1 |
| 2023/0409585 | A1* | 12/2023 | Dunning | G06F 16/248 |
| 2024/0086190 | A1* | 3/2024 | Kwatra | G06F 21/577 |
| 2024/0095337 | A1 | 3/2024 | Rowlands et al. | |

OTHER PUBLICATIONS

REFACTR, "Building Pipelines Best Practices", Wiki materials published to refactr.it website on or about Jan. 6, 2021, 3 Pages.

REFACTR, "Clone a GitHub Repository", Wiki materials published to refactr.it website on or about Feb. 10, 2021, 4 Pages.

REFACTR, "Clone a GitLab Project", Wiki materials published to refactr.it website on or about Feb. 10, 2021, 4 Pages.

REFACTR, "Core Concepts", Wiki materials published to refactr.it website on or about Nov. 16, 2020, 2 Pages.

REFACTR, "Credential Types", Wiki materials published to refactr.it website on or about Dec. 22, 2020, 2 Pages.

REFACTR, "Deprecation Schedule", Wiki materials published to refactr.it website on or about Jul. 21, 2021, 2 Pages.

REFACTR, "Expression Reference", Wiki materials published to refactr.it website on or about May 17, 2021, 8 Pages.

REFACTR, "Getting Started", Wiki materials published to refactr.it website on or about Mar. 29, 2021, 3 Pages.

REFACTR, "Kubernetes on Google Cloud Platform", Wiki materials published to refactr.it website on or about Mar. 9, 2021, 3 Pages.

REFACTR, "Managing Teams", Wiki materials published to refactr.it website on or about Mar. 9, 2021, 2 Pages.

REFACTR, "Read and Write Files", Wiki materials published to refactr.it website on or about Nov. 10, 2020, 3 Pages.

REFACTR, "Reference", Wiki materials published to refactr.it website on or about Mar. 9, 2021, 1 Page.

REFACTR, "Release Notes", Wiki materials published to refactr.it website on or about Jul. 21, 2021, 8 Pages.

REFACTR, "Runners", Wiki materials published to refactr.it website on or about Mar. 29, 2021, 3 Pages.

REFACTR, "Running Pipelines", Wiki materials published to refactr.it website on or about May 17, 2021, 3 Pages.

REFACTR, "Send an HTTP Request", Wiki materials published to refactr.it website on or about Nov. 1, 2020, 4 Pages.

REFACTR, "Sharing Pipelines", Wiki materials published to refactr.it website on or about Mar. 9, 2021, 3 Pages.

REFACTR, "Tutorials", Wiki materials published to refactr.it website on or about Mar. 9, 2021, 1 Page.

REFACTR, "Using the API", Wiki materials published to refactr.it website on or about Mar. 9, 2021, 2 Pages.

REFACTR, "Using the CLI", Wiki materials published to refactr.it website on or about Mar. 9, 2021, 4 Pages.

"U.S. Appl. No. 17/946,776 Non-Final Office Action mailed Aug. 12, 2024",, 25 pages.

UKIPO,, "UK Application No. 2312859.8 Examination Report mailed Aug. 15, 2024", 3 pages.

UKIPO,, "UK Application No. 2312859.8 Search and Examination Report mailed Feb. 23, 2024", 8 pages.

"U.S. Appl. No. 17/946,776 Final Office Action mailed Mar. 24, 2025", 26 pages.

UKIPO,, "UK Application No. 2312859.8 Examination Report mailed Mar. 12, 2025", 3 pages.

* cited by examiner

CATALOG FOR MANAGING MODULAR CODE

FIELD

The present disclosure relates to techniques for managing and deploying applications and other code for an enterprise.

BACKGROUND

Enterprise networks are becoming more complex, and security threats are become more sophisticated. User applications and other deployed software for an enterprise may require regular updates for functionality, security, or both. Against this backdrop, there remains a need for improved techniques for deploying enterprise solutions and supporting security infrastructure in a manner that facilitates secure, policy-compliant revisions as software changes over time in response to evolving user needs, policy requirements, and security environments.

SUMMARY

In one aspect, a catalog of pipelines for modular coding integrates resources for consistent use and verification of individual pipeline components. The platform may incorporate tools and metadata for version control, verification, and licensing in order to support a user when creating and deploying applications using resources from the catalog. In another aspect, a catalog of pipelines for modular coding integrates resources for security compliance. The platform may incorporate tools and metadata for selecting suitable compliance standards and verifying security compliance for existing pipelines within the catalog as well as new pipelines created from existing pipelines.

A catalog of pipelines for modular coding integrates resources for consistent use and verification of individual pipeline components. The platform may incorporate tools and metadata for version control, verification, and licensing in order to support a user when creating and deploying applications using resources from the catalog.

In an aspect, a computer program product disclosed herein may include computer executable code embodied in a non-transitory computer readable medium that, when executing on one or more computing devices, causes the one or more computing devices to perform the steps of storing a catalog of pipelines for performing security functions, and storing a description of a pipeline in the catalog of pipelines. The description may include an identifier, a version, and a definition. The definition may include one or more inputs to the pipeline, one or more outputs of the pipeline, and a graph of other pipelines from the catalog that contain code segments used in the pipeline. The graph may characterize a location for accessing the code segments for each other one of the pipelines and a functional location of the code segments for each of the other pipelines in the pipeline. The code may further cause the one or more computing devices to perform the steps of: traversing one or more other graphs for each other pipeline in the definition; adding graph data from the one or more other graphs to the graph of other pipelines, thereby providing an integrated graph for all of the code segments used in the pipeline; and storing the integrated graph in the description of the pipeline.

Implementations may include one or more of the following features. The catalog may be distributed among two or more different data centers. The catalog may be stored in a central data repository accessible to registered users of the catalog. The code may further cause the one or more computing devices to perform the step of synchronizing the catalog using a plurality of pipelines stored in two or more remote repositories of pipelines. Synchronizing may include retrieving one or more of the plurality of pipelines from one or more of the remote repositories of pipelines to the catalog. The description may include at least one of a digital signature for verifying a source of the pipeline, a digital signature for verifying a source of the other pipelines in the graph of other pipelines from the catalog, and a digital signature for verifying a source of one of the code segments used in the pipeline.

In an aspect, a method disclosed herein may include: storing a catalog of pipelines for performing security functions, and storing a description of a pipeline in the catalog of pipelines. The description may include an identifier, a version, and a definition. The definition may include one or more inputs to the pipeline, one or more outputs of the pipeline, and a graph that characterizes a location for accessing resources for each other one of the pipelines and a functional location of the resources for each of the other pipelines in the pipeline. The method may further include: verifying one or more of the other pipelines from the catalog containing resources used in the pipeline, thereby providing a verification for the pipeline; and publishing the pipeline in the catalog for access and use by registered users of the catalog.

Implementations may include one or more of the following features. Verifying one or more of the other pipelines may include verifying an operation on one or more corresponding resources for at least one of the other pipelines. Verifying one or more of the other pipelines may include verifying a digital signature for at least one of the other pipelines. Verifying one or more of the other pipelines may include verifying a programmatic interface between at least two of the other pipelines associated by the graph. Verifying one or more of the other pipelines may include verifying a source of at least one of the other pipelines. Verifying one or more of the other pipelines may include receiving one or more licensing requirements for at least one of the other pipelines and explicitly accepting the one or more licensing requirements for use of the at least one of the other pipelines. The method may further include automatically securing an acceptance of the one or more licensing requirements by a user requesting the pipeline from the catalog. The method may further include storing a result of the verification in the description of the pipeline. Publishing the pipeline in the catalog may include conditionally publishing the pipeline when the verification satisfies a predetermined condition.

In an aspect, a system disclosed herein may include a data repository storing a catalog of pipelines for performing security functions, and a description of a pipeline stored in the catalog of pipelines. The description may include an identifier, a version, and a definition including one or more inputs to the pipeline, one or more outputs of the pipeline, and a graph of other pipelines from the catalog containing resources used in the pipeline, where the graph characterizes a location for accessing the resources for each other one of the pipelines, a functional location of the resources for each of the other pipelines in the pipeline, and one or more compatible versions of at least one of the other pipelines identified in the graph. The system may further include a search interface for searching the catalog for pipelines of interest.

Implementations may include one or more of the following features. The system may further include an integrated development environment for creating and deploying an application using the catalog of pipelines, the integrated development environment including a user interface for selecting and arranging pipelines from the catalog into the application. The system may further include a version identifier specifying, for the pipeline stored in the catalog, a compatibility with one or more prior versions of the pipeline. The data repository may be a cloud-based data repository. The data repository may be a federated data store.

BRIEF DESCRIPTION OF THE DRAWINGS

The foregoing and other objects, features, and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

DESCRIPTION

Embodiments will now be described with reference to the accompanying figures. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

It should also be understood that endpoints, devices, compute instances, or the like that are referred to as "within" an enterprise network may also be "associated with" the enterprise network, e.g., where such assets are outside an enterprise gateway but nonetheless managed by or in communication with a threat management facility or other centralized security platform for the enterprise network. Thus, any description referring to an asset within the enterprise network should be understood to contemplate a similar asset associated with the enterprise network regardless of location in a network environment unless a different meaning is explicitly provided or otherwise clear from the context.

Figure 1:
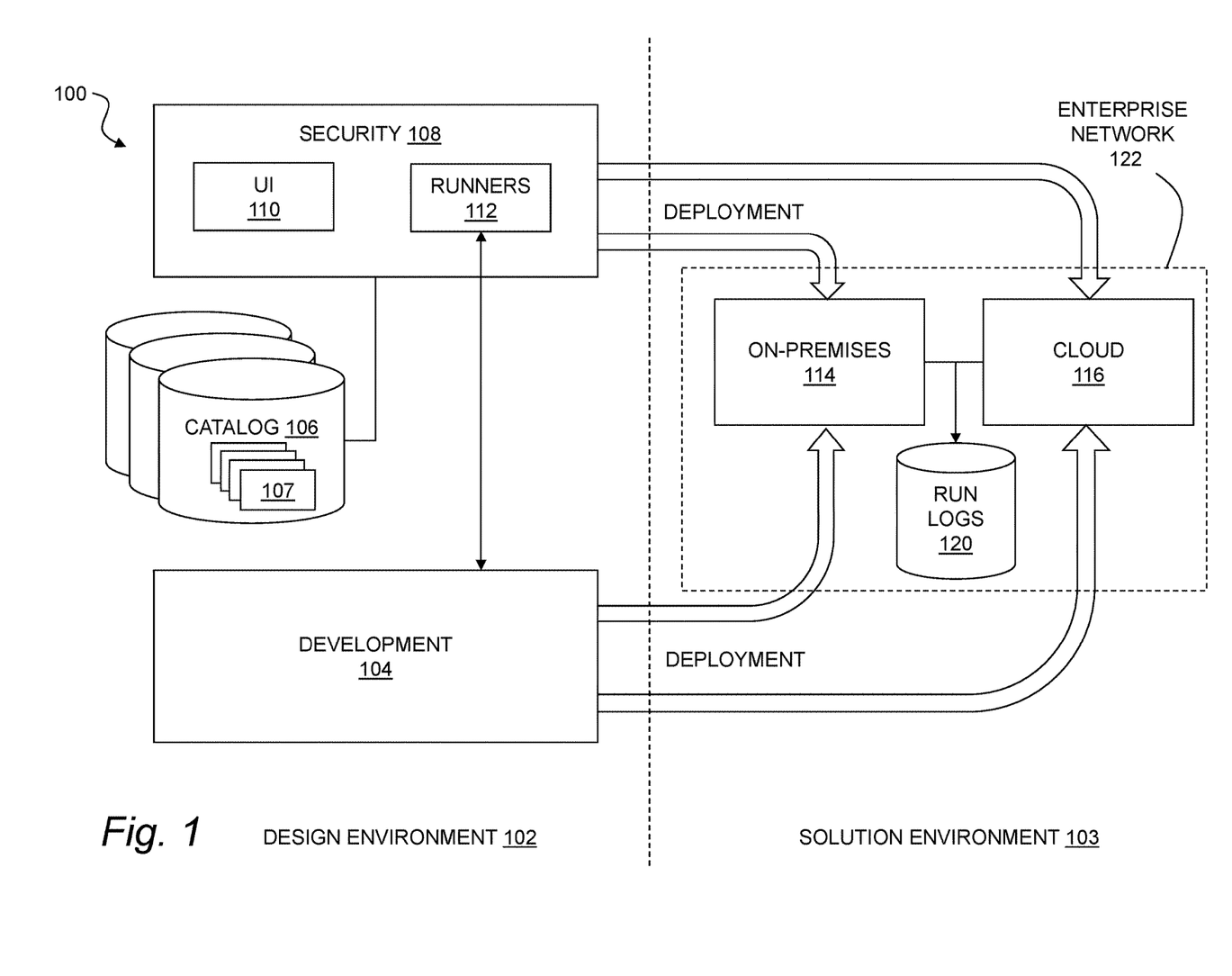
FIG. 1 illustrates an environment for deploying an enterprise solution.

FIG. 1 illustrates an environment for deploying an enterprise solution. In general, this environment 100 may include a design environment 102 where an enterprise solution is designed and tested, along with a deployment environment 103 where the enterprise solution is deployed for use. The deployment environment 103 may, for example, include an enterprise network such as any of the enterprise networks described in U.S. Pat. Pub. No. 2021/0397738, the entire content of which is hereby incorporated by reference. The design environment 102 may generally include a development platform 104, a security operations platform 108, and one or more pipeline catalogs 106. It will be appreciated that, while the design environment 102 is depicted as containing separate platforms for security and development, these functions may be combined in any suitable manner. For example, the security operations platform 108, or the accompanying functions described herein, may be integrated into the development platform 104, and/or may incorporate any of a variety of third-party resources (in addition to various third-party pipelines 107 as described below), or any combination of these useful for supporting security and/or policy management for an enterprise solution.

The development platform 104 may include any suitable arrangement of resources for the design and deployment of enterprise solutions, such as an integrated development environment providing tools for a development operations team or other design team to build, test, package, and deploy solutions for enterprise users or the like. The development platform 104 may, for example, include any commercially available or proprietary continuous integration and delivery ("CI/CD") tools, or other tools, platforms, resources, and the like to aid in manual and/or automated design and deployment of enterprise solutions. Modern integrated development tools will typically include a variety of resources that support consistent integration of build, package and testing of applications in order to facilitate frequent code changes to a (potentially complex) code base for an enterprise solution. According to contemporary CI/CD principles, the environment may also support automated delivery to development and testing environments, as well as storage of environment-specific parameters required by a customer. A CI/CD automation platform may also make any necessary calls to services, web servers, databases, and so forth, that might require restarting or other action with each new code deployment. As noted herein, the development platform 104 may also include a security platform, or any of the various security functions or tools described herein, without departing from the scope of this disclosure.

The design environment 102 may include one or more pipeline catalogs 106. In general, security solutions deployed by the security operations platform 108 may be designed using modular code stored as pipelines 107. The pipeline catalogs 106 may include any number of local data stores, remote data stores, or combination of these. The data stores used as pipeline catalogs 106 may use versioning, access controls, and so forth, and may be federated, synchronized, or otherwise managed for distributed or centralized control of pipeline archives. Each pipeline catalog 106 may be publicly shared, e.g., outside an enterprise or other network or entity, or may be privately maintained for exclusive use by authorized users. One or more of the pipeline catalogs 106 may also or instead include a fee-based data repository that is provided to users on a paid subscription or per-transaction basis.

Each pipeline 107 stored in one (or more) of the pipeline catalogs 106 may include a sequence of steps, executable by a computing device, to automate a workflow, such as a security workflow, and may also include any number of predefined input variables and outputs configured to perform actions intended for the pipeline 107. Each pipeline 107 may also or instead provide programmatic access to another resource such as a database, website, web or network-accessible application, cloud computing resource, certificate authority, identity management platform, development tool, development environment, and so forth. In one aspect, one of the pipelines 107 may include programmatic access to any such resource, along with a wrapper such as code, a programming interface, a user interface, or other components for user access to and configuration of any of such a resource. More generally, any programmatically accessible resource, whether in the form of scripts, compiled code, libraries, network-accessible resources, databases, programming platforms, development environments, tools, markup language descriptions, and so forth, as well as combinations of the foregoing, are referred to herein as "resources," and a resource should be considered to include any or all of the foregoing, unless a more specific meaning is explicitly provided, or otherwise clear from the context.

The variables for a pipeline 107 are generally structured data used by a pipeline 107 at runtime, and may have a corresponding scope that defines where a variable is available (e.g., within a pipeline 107, within a project using a pipeline 107, within an atomic code module, etc.). Each pipeline 107 may also generally include expressions to allow manipulation of data during pipeline execution. Pipelines 107 may also support credentials using reusable authentication details so that, e.g., the credentials can be passed among pipelines 107 or into atomic code modules without requiring continuous re-authentication. This may, for example, include generic credential data such as a generic secret, a username/password, bearer tokens, and the like, as well as platform-specific credential data such as a Microsoft™ Azure™ service principal account, an IAM Access Key for Amazon™ Web Services (AWS™), a Service Account for Google™ Cloud Platform, an (for Application Programming Interface access control to the Azure™ Active Directory), an SSH (Secure Shell) private key, and so forth.

Each pipeline 107 may include a description using, e.g., YAML (YAML Ain't Markup Language) or any other suitable descriptive markup language or the like. The description may specify details for using the pipeline 107. For example, a pipeline description may include a job that specifies when and how the pipeline 107 executes by providing, e.g., a trigger or the like that initiates execution of the pipeline 107. The trigger may be an event, a schedule, a manual instruction, or some combination of these. More generally, a pipeline 107 may be coupled to software from the development platform 104 using any number of explicit, implicit, or other connections. For example, a resource in the development platform 104 may be explicitly, programmatically hooked to a pipeline 107 to call any corresponding security resources when needed. In another aspect, a pipeline 107 may be called implicitly, e.g., where the pipeline 107 is triggered by an event that is detected, e.g., by instrumentation within the enterprise solution, hardware instrumentation within a user device, a local security agent deployed on an endpoint within the enterprise, a security firewall executing within the enterprise, a third party security service that monitors endpoints or network activity for the enterprise, or any other source of events or detections within the enterprise.

The pipeline description may also or instead include an identifier, a version, and a definition for the pipeline 107. The identifier may be any human-readable or machine-readable identifier for uniquely identifying the pipeline 107. The version may be a sequential version identifier (e.g., 1, 2, 3, 4, . . . ) or any other hierarchical or structured version identifier for identifying the relationship to other variants of the pipeline 107.

The definition for the pipeline 107 may include one or more inputs to the pipeline 107, one or more outputs of the pipeline 107 and a graph characterizing a relationship with other pipelines from the pipeline catalog(s) 106. Thus each pipeline 107 may include resources such as code segments internal to the pipeline 107, as well as pointers (the graph) to other pipelines 107 and/or other resources, which themselves may contain code segments used in the pipeline 107 and/or other pipelines 107 that form a part of the pipeline 107. This permits modular reuse of resources such as code segments and programming tools, as well as pipelines 107 that are built of such resources and pipelines 107. The graph contained in the definition may also characterize a location for accessing each other code segment from each other pipeline 107, as well as the functional location of each code segment in the pipeline 107. In this context, the "location" for accessing code is a Uniform Resource Location ("URL"), path, or the like specifying a network-accessible location where the code segment (or pipeline 107 containing the code segment) can be located. The "functional location" is the position within the graph where that code segment is located, i.e., where it functionally couples to other modular pieces within the pipeline 107 that is described by the definition. In this manner, information for modular re-use of resources such as code segments (and pipelines 107 using such resources) can be provided within the definition of the pipeline 107. For example, the definition may indicate where a code segment (or other resource or pipeline) can be found or executed in a network environment. The definition may also or instead indicate where a code segment (or other resource or pipeline) connects to the rest of the pipeline 107. The definition may also or instead indicate triggers that can initiate execution of a resource or pipeline, along with inputs and outputs for each resource or pipeline, as well as any other information necessary or helpful for using the pipeline 107 in a modular design environment as described herein.

In another aspect, a pipeline 107 may be used to share the functions of a code segment without revealing the code itself, e.g., to provide a modular application programming interface that permits programmatic access to execution of the code, but not to the underlying code itself. For example, a pipeline 107 may be published that references a location, e.g., a network address such as a Uniform Resource Locator or Internet Protocol address, where an executable version of the code can be accessed for execution, but not inspected. This may be useful, e.g., where a code creator wishes to share a useful function or library of functions, but does not wish to share access to the underlying literal code by others.

It will be understood that a pipeline 107 is described here as including a "description" that contains a "definition." In general, the "description" is intended to refer to pipeline metadata and the "definition" is intended to refer to a characterization of the structure and function of a pipeline 107. However, there is no strict hierarchical or definitional relationship between these two aspects of the pipeline 107, and no strict requirement that any particular pipeline parameter be within the description or the definition. Thus, a parameter described as being within the pipeline definition may also or instead be included in the description, and vice versa, provided that the pipeline 107 contains information needed to use the pipeline 107 in the modular manner contemplated herein. More generally, any data structure for adequately characterizing the structure and function of a pipeline may be used as a description of the pipeline 107. It will also be understood that, while pipelines are generally described as performing security or security-related functions, the techniques described herein may also or instead be advantageously used for managing modular code that does not have a security function, or that performs a combination of security and non-security-related functions. For example, a pipeline 107 may usefully be employed for database management, information technology operations, development operations, event handling, data processing, virtualization, machine learning, and any other computer function or functions useful in enterprise solutions or other computer contexts.

The environment 100 may also include a security operations platform 108 or similar platform or programming environment for designing and deploying security solutions on top of enterprise solutions that have been created in the development platform 104. As noted above, the security operations platform 108 may be integrated with the development platform 104, separated from the development platform 104, or some combination of these.

The security operations platform 108 may support a variety of security and policy functions that are managed independently from, but integrated into, an enterprise solution being designed in the development platform 104. For example, the security operations platform 108 may support application security testing, policy management, malware monitoring and detection, remediation and hardening, network automation, compliance assessment, identity and access management, cloud security, infrastructure-as-code security, infrastructure automation, incident response, and so forth. Using the techniques described herein, these security functions can be managed in a manner consistent with continuous integration and delivery of an enterprise solution even where the underlying security tools are independent from the development platform 104 where the enterprise solution is being designed. As a significant advantage, this general architecture facilitates closer coupling between traditionally separate teams and design cycles for enterprise applications, such as a development operations team and a security operations team. It should be understood that the term "security," as used in this context, should be construed broadly, and the security operations platform may support any functions consistent with operation or management of an enterprise solution, such as time stamping, cryptographic operations (e.g., validation, signatures), logging, and so forth. More generally, while security functions are described herein, any functions or design paths that are separated from application development may be integrated into a design process for an enterprise solution using the techniques described herein.

In general a new pipeline 107 may be created by combining a number of preexisting pipelines 107 and/or new resources, thus permitting modular use and reuse of pipeline code built on atomic code modules and other resources. To this end, the security operations platform 108 may include a user interface 110 (e.g., as described below) that provides a graphical user interface including tools for designing and deploying security solutions using combinations of pipelines 107.

The security operations platform 108 may also include one or more runners 112 for executing pipelines 107 from the pipeline catalog(s) 106 in various enterprise solution contexts. Runners may be deployed as containers, virtual machines, or other computing objects, and may run in parallel to support use of multiple, concurrent pipelines 107. In general, runners may be deployed as cloud-hosted runners (e.g., for customer cloud deployments), self-hosted runners (e.g., for customer on-premises deployments) that are installed and authenticated within the enterprise, or some combination of these. In general, running a pipeline 107 or job creates an individual run that stores output, such as a run log 120, for each executed step. These run logs 120 may be automatically deleted after a predetermined retention period for an enterprise. The number and type of runners 112 may depend on the solution environment (e.g., the context in which the enterprise solution is deployed), the scope of security solutions, and so forth. In general, the number and type of runners 112 may be chosen to permit security solutions developed on the security operations platform 108 to be designed and deployed without requiring platform-specific customizations upon deployment of enterprise solutions in different customer contexts.

The solution environment 103 may include, e.g., an enterprise network 122 containing any combination of physical devices, virtual devices, cloud resources, and the like used by a customer. The solution environment 103 may, for example, include an on-premises deployment 114 of an enterprise solution, a cloud deployment 116 of an enterprise solution, or some combination of these and/or other network-accessible computing resources.

An on-premises deployment 114 may include any number of network devices (e.g., gateways, firewalls, access points, switches, and so forth), any number of user devices (e.g., desktop computers, laptop computers, tablets, mobile devices, and so forth), and any number of servers (e.g., for applications, databases, enterprise content, electronic mail and messaging, and so forth), all of which collectively form a customer's enterprise network 122. For these deployments, an enterprise may use self-hosted runners executing on computing resources within the enterprise premises. A cloud deployment 116 may include any combination of generic or special purpose cloud computing resources such as a cloud computing platform provided by Google™ Cloud, Amazon™ Web Services (AWS™), Microsoft™ Azure™, and so forth. An enterprise solution may also or instead include Software as a Service (SaaS) resources, Zero Trust Network Applications, remote databases, and other remotely hosted or managed solutions. As a significant advantage, a security solution designed using the techniques described herein may be seamlessly deployed across any one or more of these resources, and may be automatically adapted to changes in the customer's enterprise environment, e.g., by changing the selection of runners 112 as needed.

Figure 2:
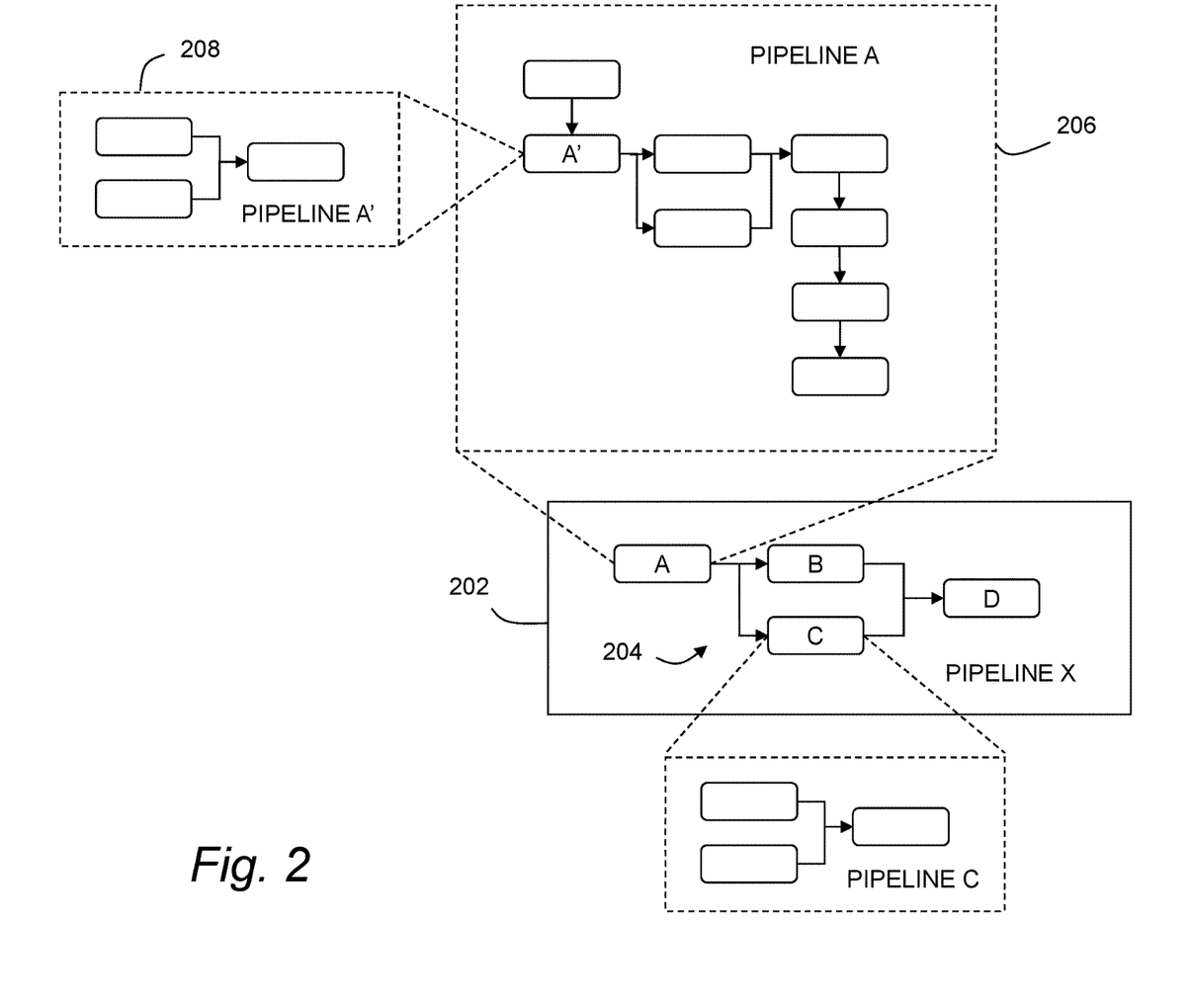
FIG. 2 illustrates a pipeline graph.

FIG. 2 illustrates a pipeline graph. A pipeline 202 (also labeled as "PIPELINE X") may be characterized in part by a graph 204 that characterizes how one or more pipelines or resources (such as modular code segments, remote resources, programming tools, libraries, etc.) (A, B, C, D) contained within the pipeline 202 connect to one another to perform an intended security function. Inputs and output from these modules may be connected to one another based on the graph. As also illustrated in FIG. 2, the first component of the pipeline 202, may itself be formed of any combination of individual resources (such as code segments, remote resources, programming tools, libraries, etc.) and pipelines, all of which are characterized, in turn, by a definition of a second pipeline 206. This second pipeline 206 is labeled as "PIPELINE A" in an expanded view, or simply "A" within the pipeline 202). As noted above, in addition to a definition describing a functional interconnection among components of the pipeline 202, along with any inputs, outputs, and triggers, the pipeline 202 may have a description (not shown) that includes, e.g., a list of other modules (pipelines or other resources), an identifier, and any other useful pipeline parameters or metadata. The pipeline 202 may also include a verifiable indication of source, e.g., a digital signature, in order to permit user verification of provenance before incorporating a pipeline from a third party source into a new pipeline.

In general, an effort is made herein to distinguish among pipelines that are formed of other pipelines and pipelines that are stand-alone components such as resources and/or code segments written or configured for a particular purpose. While the internal details of these different pipelines may vary somewhat, all such resources or modules are intended to fall within the meaning of a "pipeline" as that term is used herein, and may be defined and described using the various pipeline parameters detailed herein. Furthermore, it will be appreciated that pipelines may generally be hierarchically defined to any suitable depth. For example, the pipeline 202 illustrated in FIG. 2 includes a second pipeline 206, which in turn includes a pipeline 208 that is itself another pipeline configured to provide certain services or functions that are used in the second pipeline 206.

The possible functions of a pipeline as described herein will broadly be understood as any security function, policy function, logging function, or the like that might usefully be deployed with an enterprise solution. The full range of possible uses is beyond the scope of this document, but might usefully include, for example, security scanning, threat detection, security policy compliance, regulatory compliance, remediation, identity and access management, access control, cloud computing security, cloud data security, data integrity, code verification, user authentication, multi-factor authentication, incident response, forensic data acquisition, firewall configuration, traffic monitoring, load balancing, password and credential management, electronic mail and messaging security, and so forth.

Figure 3:
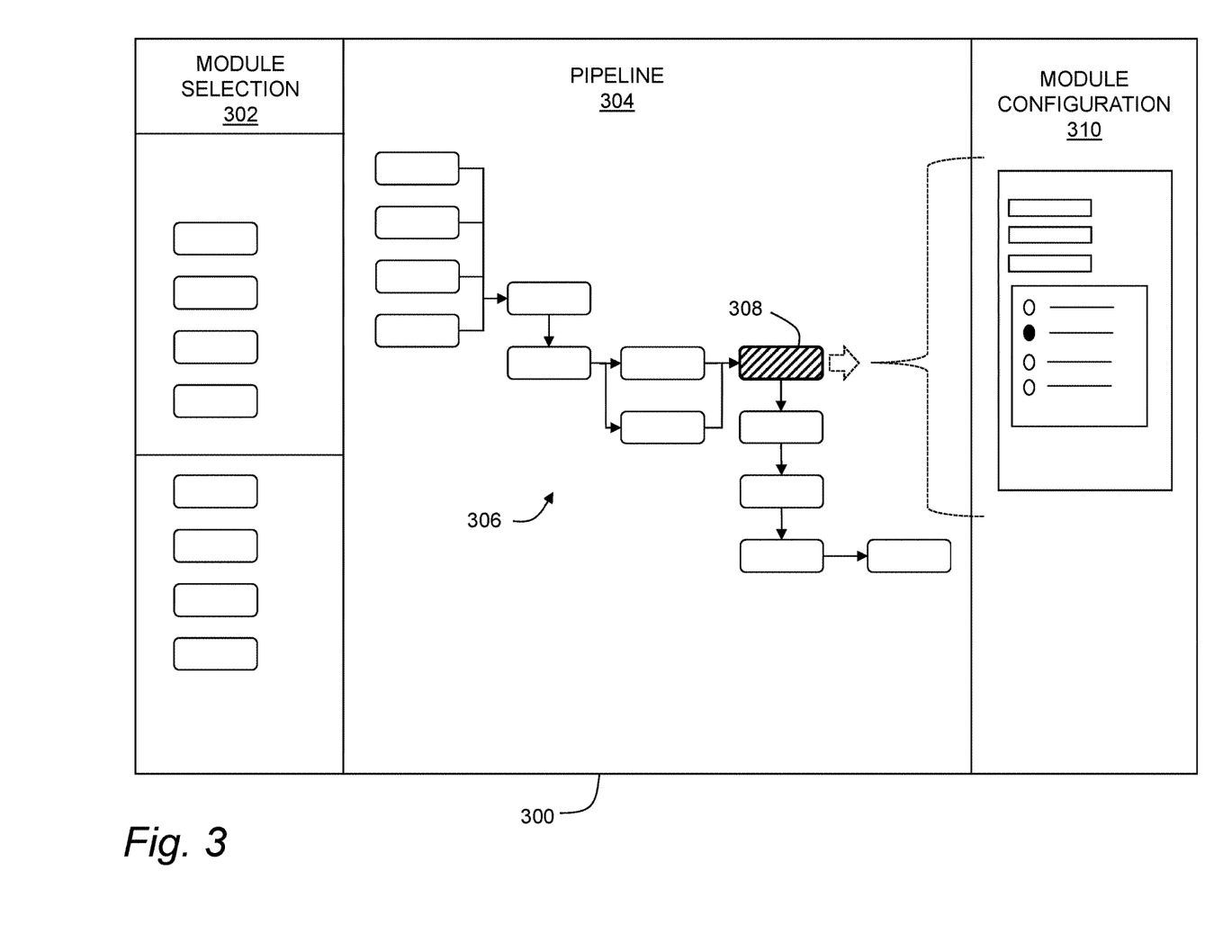
FIG. 3 shows a user interface for pipeline design.

FIG. 3 shows a user interface for pipeline design. In general, the user interface 300 may support the design of a pipeline using other pipelines stored in a pipeline catalog such as any of the pipeline catalogs described herein, or any other suitable code repository or the like. The user interface 300 may include a number and arrangement of windows that display information, along with user controls, menus, and the like for creating and configuring a pipeline as contemplated herein. In general, the user interface 300 may be supported by any suitable user interface technologies for displaying an interactive user interface to a user. This may, for example, include a browser-based user interface hosted by a web server or the like, a client-based user interface executing locally as an application on a user device (and coupled as needed to remote resources such as pipeline catalogs, software libraries, and so forth), or combinations of these.

In one aspect, the user interface 300 may include a module selection window 302. The module selection window 302 may generally provide a search interface for locating, inspecting, and selecting pipelines and other resources. The module selection window 302 may, for example, display any number of other pipelines or the like available to a user for inclusion in a current pipeline under construction. The various pipelines displayed in the module selection window 302 may be arranged alphabetically, topically (e.g., by security function), by source or library, and so forth. The module selection window 302 may also or instead support selections of specific libraries of pipelines (e.g., pipeline catalogs), a search for new catalogs, a search of existing pipelines (e.g., within user-selected catalogs) by name, code, size, author, and any other search, exploration, or similar functions related to catalogs of pipelines. In one aspect, the module selection window 302 may support drag-and-drop addition of pipelines to a current design, as well as graphical manipulation of pipeline interconnections. In another aspect, the module selection window 302 may enable an import of a selected pipeline from the module selection window 302 for use as a current pipeline, e.g., as a starting point or model for a new pipeline under construction.

The user interface 300 may also display a current pipeline window 304. This may display a current pipeline 306 under construction, and may identify some or all of the constituent pipelines forming the current pipeline 306. The current pipeline window 304 may support a range of user operations consistent with viewing, configuring, and modifying the current pipeline 306 or components thereof. For example, the current pipeline window 304 may support zooming and panning of a visual model of the current pipeline 306, graphical manipulation of pipeline-to-pipeline connections, and the addition or deletion of components of the current pipeline 306. In one aspect, a user may select, highlight, or otherwise navigate to a component 308 of the current pipeline 306, causing a module configuration window 310 to populate with configurable features or parameters of the component 308. This may include any of the definition or description parameters described herein including, e.g., a name, user, credentials (or credential source), variable names, variable definitions (scope, data type, etc.), variable initial values, version name, user notes, triggers, and so forth. The user interface 300 may also facilitate programmatic modifications to the component 308, which may then be saved as a new pipeline or, where the user has suitable version control permissions, as a new version of a pipeline.

In general, a user may employ the user interface 300 to create and modify pipelines as described herein, and to manage pipeline versions, access rights, and so forth.

Figure 4:
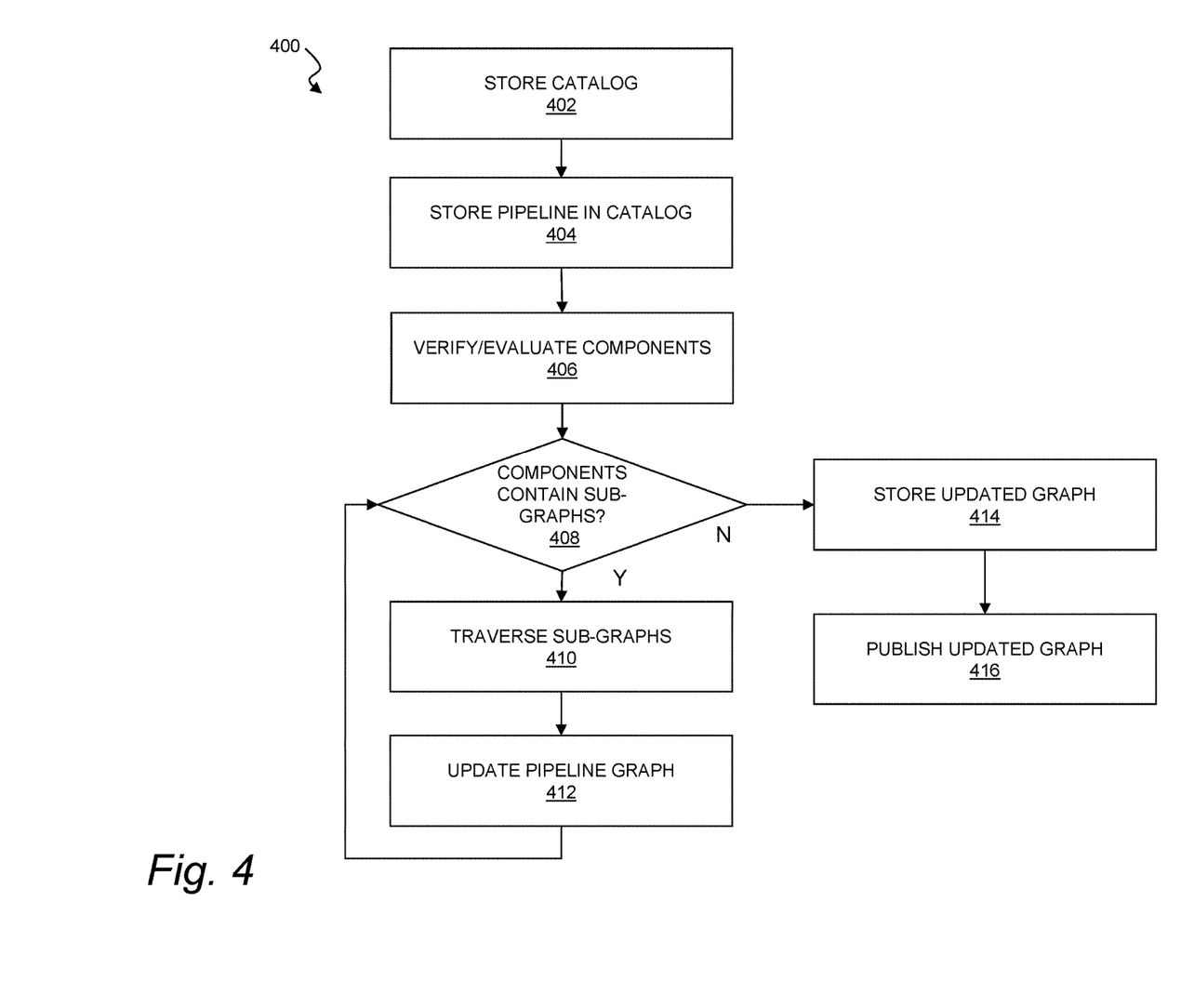
FIG. 4 illustrates a flow chart of a method for using pipelines.

FIG. 4 illustrates a flow chart of a method for using pipelines, such as any of the pipelines described herein. As noted above, each pipeline includes a graph characterizing a relationship with other graphs. However, the pipeline definitions can be nested or hierarchical. Thus, in order to evaluate the scope and content of a particular pipeline, e.g., for security compliance, memory requirements, or other purposes, it may be necessary to retrieve and inspect the graphs of each component pipeline forming the pipeline, and to continue retrieving and traversing any graphs for pipelines contained therein until all of the source code modules have been identified (e.g., no untraversed graph segments remain) so that a full graph of the pipeline can be determined. The method 400 below alleviates the delays and computing requirements for and end user of a pipeline by automatically creating and storing such a full graph for a current pipeline when it is added to the pipeline catalog. In general, this method 400 may be used with any of the pipelines, catalogs and design/deployment environments described herein.

As shown in step 402, the method 400 may include storing a catalog of pipelines for performing security functions, such as by creating and storing a library of catalogs for an enterprise or other group of users. The catalog may, for example, be distributed among two or more different data centers such as geographically separate data centers for a single enterprise user, or multiple data centers for multiple independent users. In another aspect, the catalog may be stored in a central data repository accessible to registered users of the catalog, e.g. by authenticating as a user within the user interface described above. Where the catalog is distributed, storing the catalog may also usefully include synchronizing the catalog using a plurality of pipelines stored in two or more remote repositories of pipelines so that the catalog accessible to a user at a particular network location includes a current view of the pipelines in any/all of the relevant, remote repositories. In another aspect, synchronizing catalogs may include retrieving one or more of the plurality of pipelines from one or more of the remote repositories of pipelines to the catalog, e.g., to create a single, centralized repository of pipeline data.

As shown in step 404, the method 400 may include storing a description of a pipeline, such as any of the pipelines described herein, in a pipeline catalog. By way of non-limiting example, the description may include an identifier to uniquely identify the pipeline in the catalog, a version in order to distinguish among multiple versions of a particular pipeline, and a definition. The definition may provide functional details about the pipeline. For example, the definition may include one or more inputs to the pipeline and one or more outputs of the pipeline, and where appropriate, the location of programmatic resources supporting operation of the pipeline. The definition may also include a graph of other pipelines from the catalog that contain code segments and/or other resources used in the pipeline. This graph may characterize a location (such as a URL, path, or other computer or network location) for accessing the resources for each other one of the pipelines so that the other pipeline components can be identifies and retrieved as needed at runtime, or at compile time as appropriate. The graph may also characterize a functional location of the code segments and/or other resources within the pipeline for each of the other pipelines in order to explicitly define the functional interconnection of each component within the pipeline, e.g., so that outputs from one pipeline component are properly coupled to inputs from another pipeline component to achieve the intended results of the pipeline creator.

As shown in step 406, the method 400 may include verifying components of the pipeline. In general, each pipeline is a modular code object that can incorporate one or more other resources and/or pipelines. Each pipeline may specify, in list form and/or in graph form, other components of the pipeline. By verifying these constituent parts of the pipeline, e.g., by verifying one or more of the other pipelines from the catalog (or catalogs, where multiple catalogs are available) that contains resources used in the pipeline, the method 400 may provide a verification for the pipeline formed of these constituent, verified parts. The results of a verification, such as any of the verifications describe below, e.g., for the pipeline, for the constituent parts, or both, may usefully be stored in the definition of the pipeline so that it is available to downstream users.

Verification may take a variety of forms, based on the intended use of the resulting verification for the pipeline. For example, verifying one or more of the other pipelines may include verifying an operation on one or more corresponding code segments and/or other resources for at least one of the other pipelines, e.g., in order to ensure that they do not produce errors, or that they function as expected (e.g., by responding to a trigger, accepting inputs, and providing outputs as specified in the corresponding pipeline definition). Verification of operation may also or instead include verifying a programmatic interface between at least two of the other pipelines associated by the graph.

Verifying one or more of the other pipelines may also or instead include verifying a source of at least one of the other pipelines such as by verifying a digital signature for at least one of the other pipelines, e.g., to verify a source of the constituent pipeline(s), or otherwise determining a source, author, or the like associated with the constituent pipeline(s). In order to facilitate cryptographic verification of source, the description of a pipeline in the catalog may include at least one of a digital signature for verifying a source of the pipeline, a digital signature for verifying a source of other pipelines in a graph of other pipelines (e.g., in the definition for the pipeline), and a digital signature for verifying a source of one of the resources used in the pipeline.

Verification may also or instead include licensing verification. For example, verifying one or more of the other pipelines may include receiving one or more licensing requirements for at least one of the other pipelines and explicitly accepting the one or more licensing requirements for use of the at least one of the other pipelines. Thus, for example, the user interface may explicitly request from a pipeline creator, and receive through the user interface, acknowledgement and/or acceptance of licensing terms associated with one of the pipelines. In another aspect, the pipeline may automatically secure an acceptance of licensing requirements by a user requesting the pipeline from the catalog, e.g., to secure suitable acceptance of terms from the end user before the pipeline is deployed in a solution environment. As a significant advantage, managing licensing requirements for pipeline components in this manner can automatically produce a pre-audited or a license-compliant pipeline that self-identifies all licensing restrictions and, where necessary, secures related developer and/or end-user licensing rights for use of third party code.

In one aspect, step 406 of the method 400 may include evaluating a security compliance of the pipeline. This may, for example, include evaluating security compliance of the pipeline based on a security compliance framework. In one aspect, this evaluation may be performed directly based on evaluation of the pipeline. In another aspect, this may be performed indirectly or inferentially based on evaluation of pipeline components. Thus in one aspect, evaluating the security compliance of the pipeline may include evaluating a component security compliance of each of the other pipelines identified in the description of the pipeline based on a security compliance framework, and then evaluating a security compliance of the pipeline formed of the pipeline components based on the component security compliance of each of the other pipelines. In one aspect, evaluating the component security compliance for at least one of the other pipelines may include verifying an operation of at least one of the resources used in the at least one of the other pipelines as described above, verifying a source of the at least one of the other pipelines from the catalog verifying a source of at least one of the resources used in the at least one of the other pipelines, or otherwise verifying or validating components of the pipeline as described herein.

In one aspect, component security compliance may be based on an industry standard compliance framework. For example, security compliance may be evaluated based on the Health Insurance Portability and Accountability Act (HIPAA), a federal law creating national standards to protect certain patient information for being disclosed without consent or knowledge. By certifying that each pipeline component is HIPAA-compliant, the pipeline formed from these pipeline components can be similarly certified. In another example, security compliance may be based on Security Operations Center 2 (SOC 2), a voluntary compliance standard for service organizations that specifies how organizations should manage customer data. The standard is based on trust services criteria such as security, availability, processing integrity, confidentiality, and privacy. By determining that individual pipeline components are SOC 2 compliant, a pipeline formed of these pipeline components may, with suitable safeguards, be certified as SOC 2 compliant without requiring detailed security analysis of the composite pipeline.

Although HIPAA and SOC 2 are provided as examples above, any regulatory compliance framework, industry standard compliance framework, or other voluntary or mandated compliance framework may be enforced for pipelines and pipeline components using the techniques described herein. At the same time, when a security compliance of the pipeline fails to meet a predetermined condition (e.g., for compliance with an applicable rule or standard), e.g., based on an inspection of pipeline components, evaluating the security compliance for the pipeline may include evaluating the security compliance for the pipeline independently from the component security compliance of each of the other pipeline components in the graph of the pipeline. The method 400 may also or instead include verifying the security compliance of the pipeline independently from and/or in addition to a verification of the component security compliance of each of the other component pipelines contained in the pipeline.

In one aspect, the compliance framework used for evaluating the security compliance of the pipeline may include a security policy specified by an end user. This may, for example, include any customized rules, policies, or the like created by and/or applied by an enterprise. This may also or instead include standards-based policies and/or standards-based policy frameworks that provide industry-wide frameworks, descriptions, benchmarks, and accreditation standards useful for evaluating the security policy of a proposed enterprise solution. For example, the MITRE™ ATT&CK™ Framework codifies a curated knowledge base and model for known behaviors and targets of malicious attacks, derived from real-world observations of cyber attackers. The National Institute of Standards and Technology (NIST) 800 series was developed to address and support he security and privacy needs for U.S. Federal Government Information, and provides a range of guidelines, recommendations, and technical specifications for cybersecurity. The Center for Internet Security (CIS) also provides a set of benchmarks and controls for securing computer resources from cloud providers to operating systems. These and other industry security standards provide useful frameworks for evaluating security compliance, and may be deployed in whole or in part to evaluate the security of pipelines and pipeline components as described herein. As a significant advantage, the use of graphs facilitates passing accreditation, certification, or other security posture information from components or modules up to a pipeline in a way that can facilitate certification of the aggregated pipeline based on previous evaluation of the underlying, constituent parts.

As shown in step 408, the method 400 may include identifying graphs in constituent pipelines within a pipeline. As noted above, a pipeline may include a definition containing a graph that characterizes the functional relationship among pipeline components. However, a component of the pipeline may be another pipeline that contains an internal sub-graph characterizing its own sub-components, such as PIPELINE A' illustrated in FIG. 2. In order to ensure that the graph of a pipeline accurately depicts the full scope of pipeline components, each such sub-graph may be identified and traversed to identify additional sub-graphs and components. This process may be recursive, and may continue until each graph in each constituent component has been identified and traversed to identify all constituent parts and corresponding resources.

As shown in step 410, where a pipeline component contains its own sub-graph of pipeline components, the method 400 may include traversing one or more of these other graphs for each other pipeline in the definition. In general, this may include any suitable programmatic exploration of the scope of such graphs in order to support complete determination of the graph scope and addition of these sub-graphs to the graph for the pipeline that contains the various sub-components.

As shown in step 412, the graph for a pipeline may then be updated. The method 400 may then return to step 408 where each sub-graph identified and added to the pipeline in steps 410 and 412 may then be examined to determine whether these sub-graphs contain any sub-sub-graphs therein that require further exploration. This process may continue until the full extent of the graph for the pipeline has been identified and traversed to a graph node that does not contain any additional graph edges therein that couple the corresponding component to any sub-components.

As shown in step 414, where the graph of the pipeline does not contain any further components with sub-graphs, the method 400 proceed to step 414 where the updated graph may be stored. This may include adding graph data from the one or more other graphs to the graph of other pipelines, thereby providing an integrated graph for all of the resources used in the pipeline. However, it will be understood that updating may also or instead be performed incrementally as the graph is explored, e.g., during steps 408-412 above. Whether the integrated graph is created incrementally (e.g., during traversal), or at the conclusion of the graph exploration process, step 414 may generally include storing the integrated, updated graph in the definition of the pipeline. Storing the updated graph may also or instead include adding other metadata derived during the pipeline evaluation process to the pipeline, such as by adding licensing data concerning acceptance of licensing terms, or by adding the security compliance data obtained in step 406 to the description of the pipeline.

As shown in step 416, the method 400 may include publishing the pipeline in a catalog. Where the graph has been augmented as described above, this may include publishing the pipeline including the integrated graph. Where the catalog has use restrictions, this may include publishing the pipeline for access and use by registered users of the catalog. Alternatively, where there are no restrictions, either one the catalog, or on the published pipeline within the catalog, the pipeline may be accessed by any user connected to the catalog through a data network or the like.

In one aspect, publishing the pipeline may include conditionally publishing the pipeline, such as by conditionally publishing the pipeline when the verification described above satisfies a predetermined condition. In this manner, publication may be conditioned on satisfaction of any suitable objective conditions such as compliance with a regulatory framework, compliance with a customer security policy, compliance with security rules or requirements, and so forth. By way of non-limiting examples, this may include compliance with a security policy for an enterprise, satisfactory source authentication or source verification for pipeline components, functional verification, user rights to access and run pipeline components, satisfaction of licensing requirements, and so forth. This may also or instead include other verification conditions selected for an enterprise in order to ensure proper operation of the pipeline such as requirements concerning aggregated code size or complexity, memory usage restrictions, platform compatibility, scalability, and so forth.

According to the foregoing, there is also described herein a system for managing pipelines. This system may include a data repository storing a catalog of pipelines for performing security functions, a description of a pipeline stored in the catalog of pipelines, and a search interface for searching the catalog for pipelines of interest. The data repository may, for example, include a cloud-based data repository, a federated data store, or any other centralized or distributed data storage facility for network-accessible storage of pipelines and related data. In general, the description of the pipeline may include an identifier, a version, and a definition, all as described herein. For example, the definition may specify one or more inputs to the pipeline, one or more outputs of the pipeline, and a graph of other pipelines from the catalog containing resources used in the pipeline. The definition may also or instead include other metadata for the pipeline such as a source, licensing information, verification data, and so forth. The graph may characterize a location for accessing the resources for each other one of the pipelines, as well as a functional location of the resources for each of the other pipelines in the pipeline. As noted above, this may include a graph of components within the pipeline, and may optionally be augmented with sub-graphs for components within the pipeline.

In one aspect, the pipeline may include a version identifier specifying, for the pipeline stored in the catalog, a compatibility with one or more prior versions of the pipeline. The definition for the pipeline may also or instead specify one or more compatible versions of at least one of the other pipelines identified in the graph so that, where components are updated over time, versions of pipeline components can be manually or automatically updated where updated, compatible versions exist.

The system may also include an integrated development environment or other development platform or the like for creating and deploying an application using the catalog of pipelines. The integrated development environment may include a user interface for selecting and arranging pipelines from the catalog into the application, e.g., by specifying triggers, hooking to security pipeline components, or otherwise defining events or detections that might usefully invoke security pipelines for a deployed enterprise solution.

In another aspect, a system for evaluating security compliance disclosed herein includes a data repository storing a catalog of pipelines for performing security functions, a description of a pipeline stored in the catalog of pipelines, and an integrated development environment for creating and deploying an application using the catalog of pipelines. The integrated development environment may include a user interface for selecting and arranging pipelines from the catalog into the application. The description of the pipeline may generally include an identifier for the pipeline, a version for the pipeline, a definition for the pipeline, and a security compliance of the pipeline. In general, the definition for the pipeline may include one or more inputs to the pipeline, one or more outputs of the pipeline, and a graph of other pipelines from the catalog containing resources used in the pipeline. The graph, in turn, may characterizing a location for accessing the resources for each other one of the pipelines and a functional location of the resources for each of the other pipelines in the pipeline, The description of the pipeline may also or instead include a security compliance of the pipeline based on a comparison of the other pipelines in the graph to a compliance framework for a user of the data repository.

In one aspect, the system may further include a search interface to the data repository that is configured to support searches of the catalog for pipelines of interest. The data repository may include a cloud-based data repository, a federated data store, and/or any other network-accessible data storage facilities suitable for storing, publishing, and retrieving pipelines as described herein.

Figure 5:
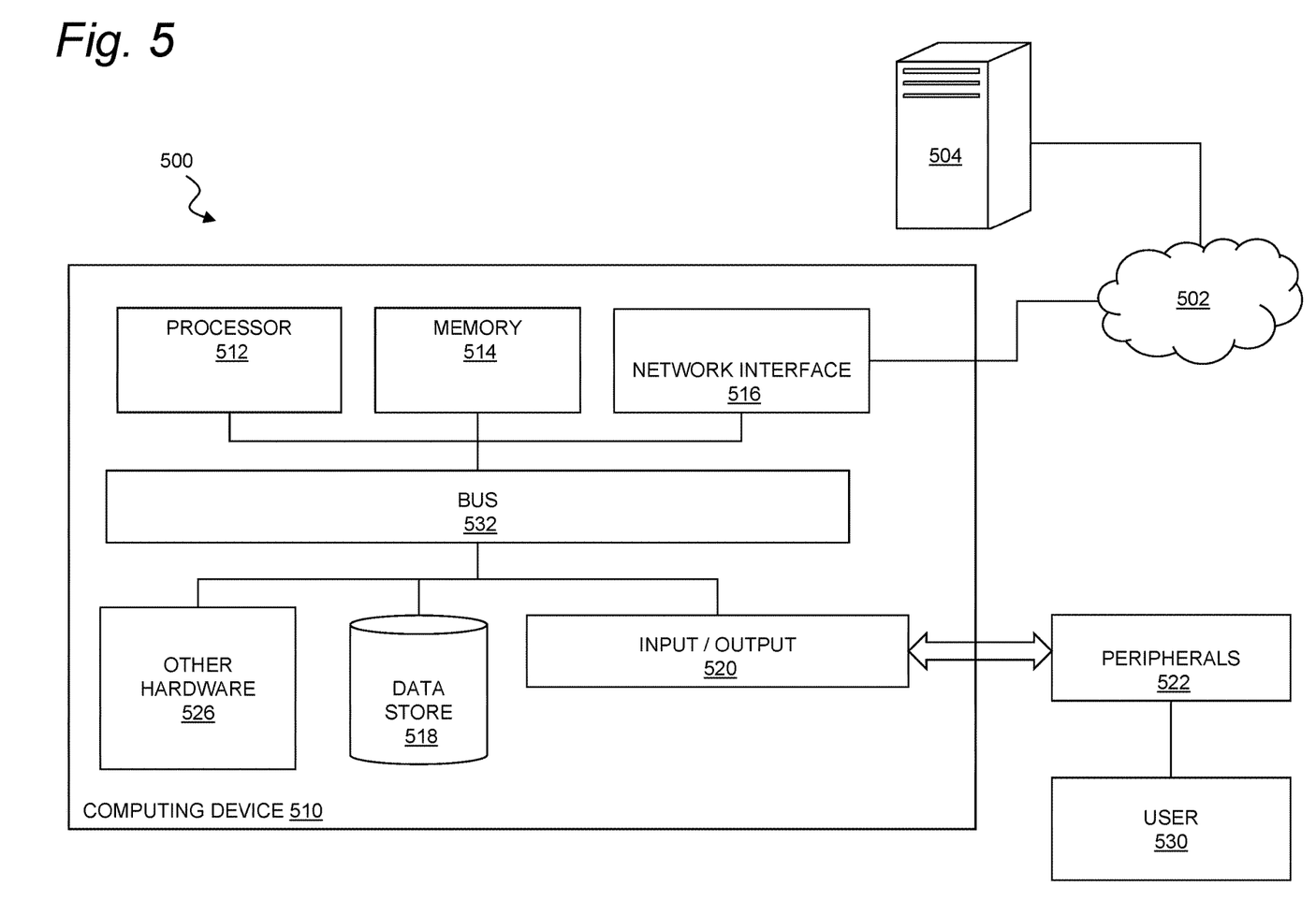
FIG. 5 illustrates a block diagram of a computer system.

FIG. 5 illustrates a block diagram of a computer system. Each of the devices or combination of devices described herein may be deployed on one or more physical computers, one or more virtual computers, or some combination thereof. FIG. 5 illustrates an example arrangement of hardware suitable for providing the corresponding computing resources for embodying these systems and any methods deployed thereon. In general, the computer system 500 may include a computing device 510 connected to a network 502, e.g., through an external device 504. The computing device 510 may be or may include any type of network device, network endpoint, or other computing device or the like as described herein, e.g., any of the computing entities shown and described above. For example, the computing device 510 may include a desktop computer workstation. The computing device 510 may also or instead be any suitable end user device that has a processor and communicates over a network 502, including without limitation a laptop computer, a desktop computer, a personal digital assistant, a tablet, a mobile phone, a television, a set top box, a wearable computer, a home device (e.g., a thermostat or a home appliance controller), and so forth. The computing device 510 may also or instead include a network device such as a firewall, a gateway, a switch, a router, an access point, and so forth. The computing device 510 may also or instead include a server or other device providing services to remote devices through a data network.

The computing device 510 may be used for any of the entities described in the environment 100 described above with reference to FIG. 1. For example, the computing device 510 be a server hosting the security operations platform 106, a server hosting the cloud computing deployment 116 of the enterprise solution, or any other virtual or physical device in the on-premises deployment 114 of an enterprise solution, or any of the other facilities or computing devices described herein. In certain aspects, the computing device 510 may be implemented using hardware or a combination of software and hardware, and the computing device 510 may be a standalone device, a device integrated into another entity or device, a platform distributed across multiple entities, or a virtualized device executing in a virtualization environment.

The network 502 may include any network described above, e.g., data network(s) or internetwork(s) suitable for communicating data and control information among participants in the computer system 500. This may include public networks such as the Internet, private networks, and telecommunications networks such as the Public Switched Telephone Network or cellular networks using third generation cellular technology (e.g., 3G or IMT-2000), fourth generation cellular technology (e.g., 4G, LTE. MT-Advanced, E-UTRA, etc.) or WiMAX-Advanced (IEEE 802.16m) and/or other technologies, as well as any of a variety of corporate area, metropolitan area, campus or other local area networks or enterprise networks, along with any switches, routers, hubs, gateways, and the like that might be used to carry data among participants in the computer system 500. The network 502 may also include a combination of data networks, and need not be limited to a strictly public or private network.

The external device 504 may be any computer or other remote resource that connects to the computing device 510 through the network 502. This may include threat management resources such as any of those contemplated above, gateways or other network devices, remote servers or the like containing content requested by the computing device 510, a network storage device or resource, a device hosting malicious content, or any other resource or device that might connect to the computing device 510 through the network 502.

The computing device 510 may include a processor 512, a memory 514, a network interface 516, a data store 518, and one or more input/output devices 520. The computing device 510 may further include or be in communication with peripherals 522 and other external input/output devices 524.

The processor 512 may be any processor(s) and/or processing circuitry suitable for providing computing resources as contemplated herein, and may in general be capable of processing instructions for execution within the computing device 510 or computer system 500. The processor 512 may include a single-core processor, a multi-core processor, a graphics processing unit, or any other type of processor or processing circuitry. The processor 512 may be capable of processing instructions stored in the memory 514 or on the data store 518.

The memory 514 may store information within the computing device 510 or computer system 500. The memory 514 may include any volatile or non-volatile memory or other computer-readable medium, including without limitation a Random-Access Memory (RAM), a flash memory, a Read Only Memory (ROM), a Programmable Read-only Memory (PROM), an Erasable PROM (EPROM), registers, and so forth. The memory 514 may store program instructions, program data, executables, and other software and data useful for controlling operation of the computing device 500 and configuring the computing device 500 to perform functions for a user. The memory 514 may include a number of different stages and types for different aspects of operation of the computing device 510. For example, a processor may include on-board memory and/or cache for faster access to certain data or instructions, and a separate, main memory or the like may be included to expand memory capacity as desired.

The memory 514 may, in general, include a non-volatile computer readable medium containing computer code that, when executed by the computing device 500 creates an execution environment for a computer program in question, e.g., code that constitutes processor firmware, a protocol stack, a database management system, an operating system, or a combination of the foregoing, and that performs some or all of the steps set forth in the various flow charts and other algorithmic descriptions set forth herein. While a single memory 514 is depicted, it will be understood that any number of memories may be usefully incorporated into the computing device 510. For example, a first memory may provide non-volatile storage such as a disk drive for permanent or long-term storage of files and code even when the computing device 510 is powered down. A second memory such as a random-access memory may provide volatile (but higher speed) memory for storing instructions and data for executing processes. A third memory may be used to improve performance by providing even higher speed memory physically adjacent to the processor 512 for registers, caching and so forth.

The network interface 516 may include any hardware and/or software for connecting the computing device 510 in a communicating relationship with other resources through the network 502. This may include remote resources accessible through the Internet, as well as local resources available using short range communications protocols using, e.g., physical connections (e.g., Ethernet), radio frequency communications (e.g., WiFi), optical communications, (e.g., fiber optics, infrared, or the like), ultrasonic communications, or any combination of these or other media that might be used to carry data between the computing device 510 and other devices. The network interface 516 may, for example, include a router, a modem, a network card, an infrared transceiver, a radio frequency (RF) transceiver, a near field communications interface, a radio-frequency identification (RFID) tag reader, or any other data reading or writing resource or the like.

More generally, the network interface 516 may include any combination of hardware and software suitable for coupling the components of the computing device 510 to other computing or communications resources. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple to other local devices, or to connect to a local area network or the like that is in turn coupled to a data network 502 such as the Internet. This may also or instead include hardware/software for a WiMAX connection or a cellular network connection (using, e.g., CDMA, GSM, LTE, or any other suitable protocol or combination of protocols). The network interface 516 may be included as part of the input/output devices 520 or vice-versa.

The data store 518 may be any internal memory store providing a computer-readable medium such as a disk drive, an optical drive, a magnetic drive, a flash drive, or other device capable of providing mass storage for the computing device 510. The data store 518 may store computer readable instructions, data structures, program modules, and other data for the computing device 510 or computer system 500 in a non-volatile form for subsequent retrieval and use. For example, the data store 518 may store without limitation one or more of the operating system, application programs, program data, databases, files, and other program modules or other software objects and the like.

The input/output interface 520 may support input from and output to other devices that might couple to the computing device 510. This may, for example, include serial ports (e.g., RS-232 ports), universal serial bus (USB) ports, optical ports, Ethernet ports, telephone ports, audio jacks, component audio/video inputs, HDMI ports, and so forth, any of which might be used to form wired connections to other local devices. This may also or instead include an infrared interface, RF interface, magnetic card reader, or other input/output system for coupling in a communicating relationship with other local devices. It will be understood that, while the network interface 516 for network communications is described separately from the input/output interface 520 for local device communications, these two interfaces may be the same, or may share functionality, such as where a USB port is used to attach to a WiFi accessory, or where an Ethernet connection is used to couple to a local network attached storage.

A peripheral 522 may include any device used to provide information to or receive information from the computing device 500. This may include human input/output (I/O) devices such as a keyboard, a mouse, a mouse pad, a track ball, a joystick, a microphone, a foot pedal, a camera, a touch screen, a scanner, or other device that might be employed by the user 530 to provide input to the computing device 510. This may also or instead include a display, a speaker, a printer, a projector, a headset or any other audiovisual device for presenting information to a user. The peripheral 522 may also or instead include a digital signal processing device, an actuator, or other device to support control or communication to other devices or components. Other I/O devices suitable for use as a peripheral 522 include haptic devices, three-dimensional rendering systems, augmented-reality displays, and so forth. In one aspect, the peripheral 522 may serve as the network interface 516, such as with a USB device configured to provide communications via short range (e.g., Bluetooth, WiFi, Infrared, RF, or the like) or long range (e.g., cellular data or WiMAX) communications protocols. In another aspect, the peripheral 522 may provide a device to augment operation of the computing device 510, such as a global positioning system (GPS) device, a security dongle, or the like. In another aspect, the peripheral may be a storage device such as a flash card, USB drive, or other solid-state device, or an optical drive, a magnetic drive, a disk drive, or other device or combination of devices suitable for bulk storage. More generally, any device or combination of devices suitable for use with the computing device 500 may be used as a peripheral 522 as contemplated herein.

Other hardware 526 may be incorporated into the computing device 500 such as a co-processor, a digital signal processing system, a math co-processor, a graphics engine, a video driver, and so forth. The other hardware 526 may also or instead include expanded input/output ports, extra memory, additional drives (e.g., a DVD drive or other accessory), and so forth.

A bus 532 or combination of busses may serve as an electromechanical platform for interconnecting components of the computing device 500 such as the processor 512, memory 514, network interface 516, other hardware 526, data store 518, and input/output interface. As shown in the figure, each of the components of the computing device 510 may be interconnected using a system bus 532 or other communication mechanism for communicating information.

Methods and systems described herein can be realized using the processor 512 of the computer system 500 to execute one or more sequences of instructions contained in the memory 514 to perform predetermined tasks. In embodiments, the computing device 500 may be deployed as a number of parallel processors synchronized to execute code together for improved performance, or the computing device 500 may be realized in a virtualized environment where software on a hypervisor or other virtualization management facility emulates components of the computing device 500 as appropriate to reproduce some or all of the functions of a hardware instantiation of the computing device 500.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared, or other device or combination of devices. In another aspect, any of the systems and methods described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y, and Z may include any method of directing or controlling any combination of such other individuals or resources to perform steps X, Y, and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A computer program product comprising computer executable code embodied in a non-transitory computer readable medium that, when executing on one or more computing devices, causes the one or more computing devices to perform the steps of:
    storing a catalog of pipelines for performing security functions, wherein the catalog of pipelines includes one or more local data stores or remote data stores;
    storing a description of a pipeline in the catalog of pipelines, wherein:
        the description includes an identifier, a version, and a definition,
        the definition includes one or more inputs to the pipeline, one or more outputs of the pipeline, one or more steps executable by a computing device to perform the security functions, and a graph of other pipelines from the catalog that contain code segments used in the pipeline, and
        the graph characterizes a location for accessing the code segments for each other one of the pipelines and a functional location of the code segments for each of the other pipelines in the pipeline;
    traversing one or more other graphs for each other pipeline in the definition including any sub-graphs until all source code modules for the pipeline have been identified;
    adding graph data from the one or more other graphs to the graph of other pipelines, thereby providing an integrated graph for all of the code segments used in the pipeline;
    adding security compliance data for each of the code segments in the integrated graph to the description of the pipeline;
    storing the integrated graph and the security compliance data in the description of the pipeline;
    evaluating a compliance of the pipeline with a security policy for an enterprise based on the description of the pipeline, the description including the security compliance data for each of the code segments in the integrated graph; and
    in response to the compliance of the pipeline with the security policy meeting a predetermined criterion, publishing the pipeline for use in the enterprise along with a second security compliance data for the pipeline derived from the security compliance data for each of the code segments in the integrated graph of the description of the pipeline.

2. The computer program product of claim 1, wherein the catalog is distributed among two or more different data centers.

3. The computer program product of claim 1, wherein the catalog is stored in a central data repository accessible to registered users of the catalog.

4. The computer program product of claim 1, further comprising computer executable code that, when executing on one or more computing devices, causes the one or more computing devices to perform the step of: synchronizing the catalog using a plurality of pipelines stored in two or more remote repositories of pipelines.

5. The computer program product of claim 4, wherein synchronizing includes retrieving one or more of the plurality of pipelines from one or more of the remote repositories of pipelines to the catalog.

6. The computer program product of claim 1, wherein the description includes at least one of a digital signature for verifying a source of the pipeline, a second digital signature for verifying a second source of the other pipelines in the graph of other pipelines from the catalog, and a third digital signature for verifying a third source of one of the code segments used in the pipeline.

7. A method comprising:
    storing a catalog of pipelines for performing security functions;
    storing a description of a pipeline in the catalog of pipelines, wherein:
        the description includes an identifier, a version, and a definition, and
        the definition includes one or more inputs to the pipeline, one or more outputs of the pipeline, and a graph that characterizes a location for accessing resources for each other one or more pipelines in the catalog of pipelines and a functional location of the resources for each of the one or more other pipelines in the pipeline;
    verifying security compliance data for each of the one or more other pipelines from the catalog containing resources used in the pipeline, thereby providing a verification of a compliance for the pipeline with a security policy; and
    in response to the verification of the compliance for the pipeline with the security policy, publishing the pipeline for use along with a second security compliance data for the pipeline derived from the security compliance data for the each of the one or more other pipelines from the catalog containing resources used in the pipeline in the description of the pipeline.

8. The method of claim 7, wherein verifying the security compliance data for the each of the one or more other pipelines from the catalog containing resources used in the pipeline includes verifying an operation on one or more corresponding resources for at least one of the other pipelines.

9. The method of claim 7, wherein verifying the security compliance data for the each of the one or more other pipelines from the catalog containing resources used in the pipeline includes verifying a digital signature for at least one of the other pipelines.

10. The method of claim 7, wherein verifying the security compliance data for the each of the one or more other pipelines from the catalog containing resources used in the pipeline includes verifying a programmatic interface between at least two of the other pipelines associated by the graph.

11. The method of claim 7, wherein verifying the security compliance data for the each of the one or more other pipelines from the catalog containing resources used in the pipeline includes verifying a source of at least one of the other pipelines.

12. The method of claim 7, wherein verifying the security compliance data for the each of one or more other pipelines from the catalog containing resources used in the pipeline includes receiving one or more licensing requirements for at least one of the other pipelines and explicitly accepting the one or more licensing requirements for use of the at least one of the other pipelines.

13. The method of claim 12, further comprising automatically securing an acceptance of the one or more licensing requirements by a user requesting the pipeline from the catalog.

14. The method of claim 7, further comprising storing a result of the verification in the description of the pipeline.

15. The method of claim 7, wherein publishing the pipeline in the catalog includes conditionally publishing the pipeline when the verification satisfies a predetermined condition.

16. A system comprising:
 a data repository storing a catalog of pipelines for performing security functions;
 a description of a pipeline stored in the catalog of pipelines, the description including:
  an identifier,
  a version, and
  a definition including one or more inputs to the pipeline, one or more outputs of the pipeline, and a graph of other pipelines from the catalog containing resources used in the pipeline,
  wherein the graph characterizes a location for accessing the resources for each other one of the pipelines, a functional location of the resources for each of the other pipelines in the pipeline, one or more compatible versions of at least one of the other pipelines identified in the graph, and security compliance data for each of the other pipelines in the pipeline, the security compliance data providing a compliance of a corresponding one of the other pipelines with a security policy; and
 a search interface for searching the catalog for pipelines of interest, wherein the search interface in response to the compliance of the corresponding one of the other pipelines with the security policy publishes the pipeline to users along with a second security compliance data for the pipeline derived from the security compliance data for the each of the other pipelines in pipeline in the graph in the description of the pipeline.

17. The system of claim 16, further comprising an integrated development environment for creating and deploying an application using the catalog of pipelines, the integrated development environment including a user interface for selecting and arranging pipelines from the catalog into the application.

18. The system of claim 16, further comprising a version identifier specifying, for the pipeline stored in the catalog, a compatibility with one or more prior versions of the pipeline.

19. The system of claim 16, wherein the data repository is a cloud-based data repository.

20. The system of claim 16, wherein the data repository is a federated data store.

* * * * *